United States Patent
Th. Vollenberg et al.

(10) Patent No.: US 7,090,926 B2
(45) Date of Patent: Aug. 15, 2006

(54) MULTI-LAYER, WEATHERABLE COMPOSITIONS AND METHOD OF MANUFACTURE THEREOF

(75) Inventors: Peter H. Th. Vollenberg, Mount Vernon, IN (US); Sandeep Dhawan, Evansville, IN (US); Kyle P. Starkey, Evansville, IN (US); Safwat E. Tadros, Evansville, IN (US)

(73) Assignee: General Electric Company, Pittsfield, MA (US)

( * ) Notice: Subject to any disclaimer, the term of this patent is extended or adjusted under 35 U.S.C. 154(b) by 8 days.

(21) Appl. No.: 10/262,919

(22) Filed: Oct. 2, 2002

(65) Prior Publication Data

US 2003/0124358 A1 Jul. 3, 2003

Related U.S. Application Data

(60) Provisional application No. 60/338,394, filed on Nov. 9, 2001.

(51) Int. Cl.
*B32B 27/34* (2006.01)

(52) U.S. Cl. ............... 428/475.5; 412/475.8; 412/476.1

(58) Field of Classification Search ............ 428/412, 428/423.5, 474.9, 475.5, 475.8, 476.1
See application file for complete search history.

(56) References Cited

U.S. PATENT DOCUMENTS

| | | | |
|---|---|---|---|
| 2,465,319 A | 3/1949 | Whinfield et al. | |
| 2,675,390 A | 4/1954 | Rosenblatt | |
| 2,888,484 A | 5/1959 | Dehm et al. | |
| 3,118,887 A | 1/1964 | Hardy et al. | |
| 3,244,708 A | 4/1966 | Duennenberger et al. | |
| 3,423,360 A | 1/1969 | Huber et al. | |
| 3,442,898 A | 5/1969 | Luethi et al. | |
| 3,444,237 A | 5/1969 | Jaffe et al. | |
| 3,635,895 A | 1/1972 | Kramer | |
| 4,001,184 A | 1/1977 | Scott | |
| 4,210,612 A | 7/1980 | Karrer | |
| 4,217,438 A | 8/1980 | Brunelle et al. | |
| 4,754,064 A | 6/1988 | Lillwitz | |
| 4,895,901 A | 1/1990 | Ramey et al. | |
| 4,895,981 A | 1/1990 | Reinert et al. | |
| 5,015,682 A | 5/1991 | Galbo | |
| 5,298,067 A | 3/1994 | Valet et al. | |
| 5,441,997 A | 8/1995 | Walsh et al. | |
| 5,480,701 A * | 1/1996 | Hiroi | 428/204 |
| 5,597,854 A | 1/1997 | Birbaum et al. | |
| 6,051,164 A * | 4/2000 | Samuels | 252/404 |
| 6,136,441 A | 10/2000 | MacGregor et al. | |
| 6,239,276 B1 | 5/2001 | Gupta et al. | |
| 6,406,775 B1 * | 6/2002 | Houde | 428/32.34 |

FOREIGN PATENT DOCUMENTS

| | | |
|---|---|---|
| EP | 0 434 608 A1 | 11/1990 |
| EP | 0 458 741 A2 | 4/1991 |
| EP | 0 464 921 A1 | 6/1991 |
| EP | 0 483 488 A1 | 9/1991 |
| WO | WO 86/03528 | 6/1986 |

OTHER PUBLICATIONS

Encyclopedia of Polymer Science and Engineering, vol. 11, John Wiley & Sons, New York: 1988, pp. 345–353.*

* cited by examiner

*Primary Examiner*—Melanie Bissett

(57) ABSTRACT

A weatherable composition comprising an upper layer that comprises an aliphatic polyamide resin and an additive composition comprising a hindered amine light stabilizer and a hydroxyphenyl triazine or pyrimidine UV absorber; an intermediate layer that comprises a polymer system compatible with polymer in the upperlayer, and optionally, an additive composition comprising $TiO_2$, dyes, pigments, and special effects additives; and a polymeric substrate, wherein the intermediate layer is disposed between and in intimate contact with the upper layer and the substrate. The composition finds utility in articles such as automotive parts.

17 Claims, No Drawings

MULTI-LAYER, WEATHERABLE COMPOSITIONS AND METHOD OF MANUFACTURE THEREOF

This Application claims rights of priority from U.S. Provisional Patent Application Ser. No. 60/338,394, filed Nov. 9, 2001, which is hereby incorporated by reference.

BACKGROUND OF THE INVENTION

There is substantial commercial interest in the use of multi-layer, weatherable polymeric materials in various product forms such as sheets, films, shaped products, thermoformed articles, packaging, and architectural products, as well as coatings. Many different plastics are used as the base layer, or substrate, in these products in order to take advantage of particular physical, chemical, and mechanical properties. The upper layer, often referred to as the topcoat, often functions to protect the base layer or layers, for example to maintain gloss and shine. However, overtime, the upper layer is aesthetically undesirable to consumers due to scratches and wear. There remains a need for weatherable compositions, particularly upper coats, that provide protection to an underlying substrate.

SUMMARY OF THE INVENTION

A weatherable, multi-layer composition comprises: an upper layer comprising: a) a polymer system consisting essentially of an aliphatic polyamide resin; b) an additive composition comprising a hindered amine light stabilizer and a hydroxyphenyl-triazine or -pyrimidine UV absorber; an intermediate layer comprising a polymeric resin compatible with the polymer system in said upper layer, and optionally an additive composition comprising $TiO_2$, dyes, pigments, or special effects additives; and a polymeric substrate, wherein the intermediate layer is disposed between and in intimate contact with the upper layer and the substrate.

The invention further relates to a weatherable, multi-layered article.

DETAILED DESCRIPTION OF THE INVENTION

It has been unexpectedly found by the inventors hereof that a weatherable, aesthetic multi-layer composition maybe achieved by using specific formulations for the various layers as disclosed herein. The layers are disposed on a polymeric substrate, which preferably comprises polycarbonate and $TiO_2$.

Upper Layer. Disclosed herein is an upper layer (most commonly a upper coat) consisting essentially of an aliphatic polyamide resin and an additive composition comprising a hindered amine light stabilizer and a hydroxyphenyl-triazine or -pyrimidine UV absorber.

By "consisting essentially of" is meant additional polymers other than to the aliphatic polyamide as described herein may be present, but not any that would adversely impact the weathering of the weatherable composition, or other improved properties of the weatherable composition over time.

Upper Layer Component 1—Aliphatic Polyamide: Aliphatic polyamide resins useful herein include linear, branched and cycloaliphatic polyamides, and are characterized by optical transparency, improved scratch resistance, and chemical resistance. These polyamides include the family of resins known generically as nylons, which are characterized by the presence of an amide group, and are represented generally by Formula 2 and Formula 3:

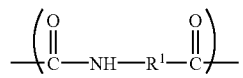

Formula 2

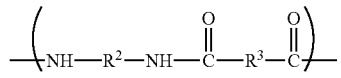

Formula 3 wherein $R^{1-3}$ are each independently $C_1$ to $C_{20}$ alkyl, $C_1$ to $C_{20}$ cycloalkyl, and the like.

Preferred polyamides include Nylon-6 (Formula 2, wherein R1 is C4 alkyl) and nylon-6,6 (Formula 4, wherein R2 and R3 are each C4 alkyl). Other useful polyamides include nylon-4,6, nylon-12, nylon-6,10, nylon 6,9, nylon 6/6T and nylon 6,6/6T with triamine contents below about 0.5 weight %, and PACM 12. Still others include amorphous nylons.

Polyamides can be obtained by a number of processes, such as those described in U.S. Pat. Nos. 2,071,250; 2,071,251; 2,130,523; 2,130,948; 2,241,322; 2,312,966; and 2,512,606. Specifically, Nylon-6 is a polymerization product of caprolactam. Nylon-6,6 is a condensation product of adipic acid and -1,6-diaminohexane. Likewise, nylon 4,6 is a condensation product between adipic acid and 1,4-diaminobutane. Besides adipic acid, other useful diacids for the preparation of nylons include azelaic acid, sebacic acid, dodecane di-acid, and the like. Useful diamines include, for example, di-(4-aminocyclohexyl)methane; 2,2-di-(4-aminocyclohexyl)propane, among others. A preferred polyamide is PACM 12, wherein $R^2$ is di-(4-aminocyclohexyl) methane and $R^3$ is dodecane diacid, as described in U.S. Pat. No. 5,360,891. Copolymers of caprolactam with diacids and diamines are also useful.

Suitable aliphatic polyamides have a viscosity of at least about 90, preferably at least about 110 milliliters per gram (ml/g); and also have a viscosity less than about 400, preferably less than about 350 ml/g as measured in a 0.5 wt % solution in 96 wt % sulphuric acid in accordance with ISO 307.

Upper Layer Component 2—HALs and UV Absorbers. The upper layer further includes an additive composition that contains a combination of a hindered amine light stabilizers and a hydroxyphenyl-triazine or -pyrimidine UV absorber. Ultraviolet stabilizers are used to improve upon the light stability, weatherability, and color retention properties. Inclusion of light stabilizers in the top layer has also been found to provide additional light stability for the subsequent layers and support material.

Useful hindered amine light stabilizers (hereinafter HALS) include substituted piperidine moieties and oligomers thereof, as disclosed in U.S. Pat. No. 4,895,901 to Ramey et al., U.S. Pat. No. 4,210,612 to Karrer, and U.S.

Pat. No. 5,015,682 to Galbo. The preferred HALS is a 4-piperidinol derivative having the general formula (4):

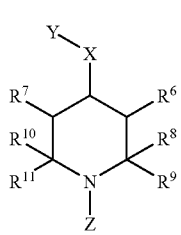

(4)

wherein X is oxygen, and Y is preferably hydrogen, or hydroxyalkyl, aminoalkyl, or alkyl substituted by both hydroxyl and amino groups, where the alkyl has up to about 20 carbon atoms on average, but may also represent a moiety compatible with the light stabilizing properties of the remainder of the molecule and that furnishes the requisite reactive group. $R^6$ and $R^7$ are each independently selected from the group consisting of a hydrogen atom, an alkyl group, an alkenyl group, or an arylalkyl group. In one embodiment, $R^6$ and $R^7$ are each hydrogen. $R^8$, $R^9$, $R^{10}$, and $R^{11}$ are each independently selected from the group consisting of an alkyl group having 1 to about 6 carbon atoms, phenyl, an arylalkyl group, an aromatic heterocyclic group having 5 or 6 carbon atoms, and containing an oxygen, sulphur or nitrogen atom, or $R^8$, $R^9$, $R^{10}$, and $R^{11}$ respectively, together or with the carbon atom to which they are attached may represent a $C_5$ to $C_{12}$ cycloalkyl group. Preferably, $R^8$, $R^9$, $R^{10}$, and $R^{11}$ are methyl. Z is an oxy radical, an alkyl group, an alkenyl group, an alkoxyalkyl group, an arylalkyl group that is unsubstituted or which has one or more substituents in its aryl moiety, including, for example, 2,3-epoxypropyl. Z is preferably represented by the formula —$CH_2COOR^{12}$, wherein $R^{12}$ is an alkyl group, an alkenyl group, a phenyl group, an arylalkyl group, or a cyclohexyl group. Most preferably, Z has the formula —$CH_2CH(R^{14})OR^{13}$, wherein $R^{14}$ is a hydrogen atom, a methyl group or a phenyl group and $R^{13}$ is a hydrogen atom, an alkyl group, an ester, a carbonyl, an acyl group, an aliphatic acyl group, or a group represented by the formula —$COOR^{15}$, or —$OOCR^{15}$, wherein $R^{15}$ is an alkyl group, a benzyl group, a phenyl group, and the like.

In one embodiment, the oligomeric HALS has formula (5):

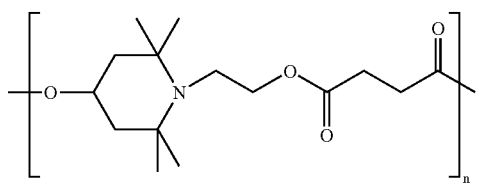

(5)

wherein n is on average greater than about 9, and less than about 12 (i.e., having a molecular weight from about 3100 to about 4000). This material is commercially available under the trade name TINUVIN 622 (CAS Number 065447-77-0, Ciba Specialty Chemicals, Inc., Basel Switzerland).

In another embodiment, the HALS has the general formula (6)

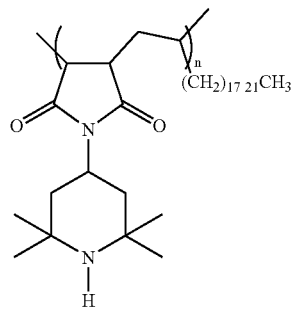

(6)

wherein n is on average greater than about 4, and less than about 7 (i.e., having a molecular weight from about 3000 to about 4000). One example of this type of HALS wherein n is on average greater than about 4 and less than about 7 is commercially available under the trade name UVINUL 5050H from BASF.

In yet another embodiment, the hindered HALS has formula (7), which is commercially available under the trade name SANDUVOR 3058 from Clariant.

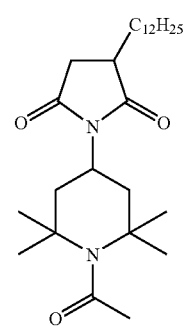

(7)

In a different embodiment, the hindered HALS has formula (8), which is commercially available under the trade name Nylostab S-EED available from Clariant.

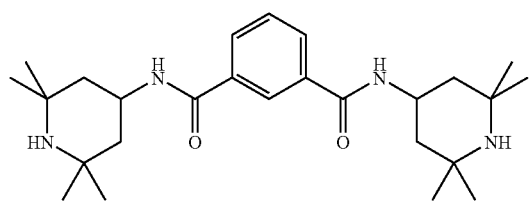

(8)

The HALS is present in the upper layer at a concentration greater than about 0.01%, preferably greater than about 0.1%, most preferably greater than about 0.5% by weight based on the total weight of the upper layer. The HALS is also present in the upper layer at a concentration less than about 10%, preferably less than about 2%, most preferably less than about 1.5% by weight based on the total weight of the upper layer.

In addition to the HALS, the additive composition in the first layer also comprises a low volatility hydroxyphenyl-triazine or -pyrimidine UV absorber. Suitable low volatility hydroxyphenyl-triazine or pyrimidine UV absorbers include compounds having a 2,4,6-trisaryl-1,3,5-triazine or 2,4,6-trisaryl-1,3-pyrimidine group, and which further contain free hydroxyl groups. Such compounds are known, being described, for example, in U.S. Pat. No. 3,118,887 to Johns et al., U.S. Pat. No. 3,244,708 to Duennenberger et al., U.S. Pat. No. 3,423,360 to Huber et al., WO 86/3528, U.S. Pat. No. 4,831,068 to Reinert et al., EP-A-434 608, EP-A-458 741, EP-A-483 488, U.S. Pat. No. 5,298,067 to Valet, U.S. Pat. No. 3,442,898 to Luethi et al., and U.S. Pat. No. 4,895,981 to Reinert et al.

With respect to the UV absorbers, in one embodiment, the UV absorbers comprise pyrimidines and triazines having two phenyl groups, and a resorcinol or substituted resorcinol group attached to the triazine or pyrimidine ring, as disclosed in U.S. Pat. No. 6,239,276 B1 to Gupta et al. and U.S. Pat. No. 5,597,854 to Birbaum et al. Suitable low volatility hydroxyphenyl-triazine UV absorbers are generally represented by formula (9):

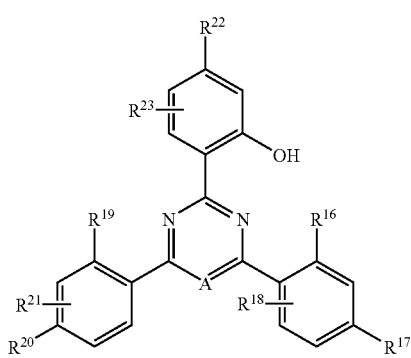

(9)

wherein A is N or CH; and $R^{16}$, $R^{17}$, $R^{18}$, $R^{19}$, $R^{20}$, $R^{21}$, $R^{22}$, and $R^{23}$ are each independently selected from the group consisting of hydrogen, alkyl, cycloalkyl, halogen, haloalkyl, alkoxy, alkylene, aryl, alkyl-aryl, or a combination thereof. Preferably, the low volatility hydroxyphenyl-triazine UV absorber has formula (10):

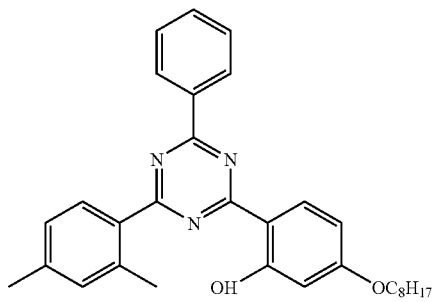

(10)

This material is commercially available under the trade name TINUVIN 1577 (CAS Number 147315-50-2, Ciba Specialty Chemicals, Inc., Basel Switzerland).

Another example of hydroxyphenyl-triazine UV absorber has formula (11):

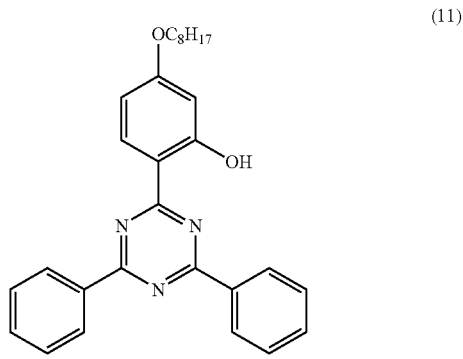

(11)

This material is commercially available under the trade name CYASORB UV-1164, from Cytec Industries.

The hydroxyphenyl-triazine or -pyrimidine UV absorbers are present in the upper layer at a concentration greater than about 0.01%, preferably greater than about 0.1%, most preferably greater than about 0.2% by weight, based on the total weight of the upper layer. Hydroxyphenyl-triazine or -pyrimidine UV absorbers are furthermore present in the upper layer at a concentration less than about 10%, preferably less than about 3%, most preferably less than about 2.5% by weight, based on the total weight of the upper layer.

Upper Layer—Optional Components. In addition to the aliphatic polyamide resin or the cycloaliphatic polyester resin depending on the desired end properties, the upper layer may comprise a blend with other materials including polyester, polycarbonate, and the like, to up to 40 wt. % based on the total weight of the resins used in the upper layer. In one embodiment, polycarbonate is used in the blend. In another embodiment, polyester is used in the blend with the aliphatic polyamide being the primary resin. Addition of the polycarbonate resin allows retention of clarity and increases the heat distortion temperature (HDT) of the upper top layer, thus allowing it to be used in a wide range of articles. The addition of polycarbonate may also beneficially alter the melt strength and crystallization behavior.

Besides the addition of other resin blends, the upper layer may also contain catalyst quenchers (also known as stabilizers) that inhibit activity of any catalysts that may be present in the resins. Catalyst quenchers are described in detail in U.S. Pat. No. 5,441,997 to Walsh et al.

In one embodiment, the quenchers used provide a transparent and colorless product. Quenchers are used at a concentration of at least about 0.001%, preferably at least about 0.005% by weight of the total layer or substrate. Quenchers are also used at a concentration of at most about 10%, preferably at most about 2% by weight of the total layer or substrate. Preferred quencher/stabilizers include an effective amount of an acidic phosphate salt; an acid, alkyl, aryl or mixed phosphite having at least one acidic hydrogen; a Group IB or Group IIB metal phosphate salt; a phosphorus oxo acid, a metal acid pyrophosphate or a mixture thereof and the like. The suitability of a particular compound for use as a stabilizer may be readily determined without under experimentation by one of skill in the art.

Useful acidic phosphate salts include sodium dihydrogen phosphate, mono zinc phosphate, potassium hydrogen phosphate, calcium dihydrogen phosphate and the like. The phosphites may have the formula $P(OR^3)(OR^4)(OR^5)$, wherein $R^3$, $R^4$ and $R^5$ are independently selected from the group consisting of hydrogen, alkyl and aryl with the proviso that at least one of $R^3$, $R^4$, and $R^5$ is hydrogen. The phosphate salts of a Group IB or Group IIB metal of the periodic table include zinc phosphate, copper phosphate, and the like. The phosphorus oxo acids include phosphorous acid, phosphoric acid, polyphosphoric acid or hypophosphorous acid. Suitable polyacid pyrophosphates are of the formula $M_xH_yP_nO_{3n+1}$, wherein M is a metal, x is from 1 to about 12, y is from 1 to about 12, n is from 2 to about 10, and the sum of x+y is equal to n+2. The preferred M is an alkaline or alkaline earth metal.

In one embodiment, the quenchers include oxo acids of phosphorous or acidic organo phosphorus compounds. Inorganic acidic phosphorus compounds may also be used as quenchers, with the most preferred quenchers being phosphoric or phosphorous acid.

The suitability of a particular compound for use as a quencher/stabilizer, and the determination of how much is to be used in the layer, are readily determined by those of skill in the art without undue experimentation.

The thickness of the upper layer is determined by a number of factors, for example the degree of weatherability required, the cost of the materials, the method of manufacture, and the like. In one embodiment, the upper layer has a thickness greater than about 0.1 mils and less than about 50 mils. In another embodiment, greater than about 2 mils and less than about 30 mils. In yet another embodiment, greater than about 5 mils on average and less than about 20 mils on average.

Intermediate Layer—Component 1—Polymer Resin. The upper layer is disposed on top of, and in intimate contact with an intermediate layer. The intermediate layer or layers comprise a polymer system compatible with the upper layer to provide a suitable adhesion with the upper top layer, and optionally an additive composition comprising HALs, UV absorbers, dyes, pigments, special effects additives, or a combination comprising at least one of the foregoing.

As used herein, a suitable adhesion between the two layers includes a peel strength of at least about 5. In one embodiment, the adhesion between the layers has a peel strength of at least about 10. In another embodiment, of at least about 15 pounds per inch (#/in), as measured by a 180 degree peel test.

Compatible/suitable polymeric resins include elastomeric resins, thermoplastic resins, thermosetting resins, derivatives thereof, and the like. Suitable polymeric resins are characterized by having a suitable adhesion between the intermediate layer and the top layer. Suitable polymeric resins include both aliphatic and aromatic polyamides, polyurethanes, and polymeric ionomers.

In one embodiment, the polymeric resin for the intermediate layer is an aliphatic polyamide as discussed above. In another embodiment, polymeric ionomers are used for the intermediate layer. In yet another embodiment, the polymeric resin for the intermediate layer is an aromatic polyamide. Examples of aromatic polyamides include polyamide 6-3-T, (trimethyl hexamethylene diamine terephthalic acid; commercially available as Trogamid, Degussa-Huels, Marl, Germany). Also included are mixtures of various polyamides, as well as various polyamide copolymers.

Examples of suitable polymeric ionomers (hereinafter ionomers) are polymers having moieties selected from the group consisting of sulfonate, phosphonate, and mixtures comprising at least one of the foregoing. Ionomers may be a reaction product of a metal base and the sulfonated and/or phosphonated polymer. The term "sulfonated polymer" includes both the sulfonated polymers produced by copolymerization with a sulfonated monomer and polymers and copolymers sulfonated by using a sulfonation agent in a post-polymerization reaction. The term "phosphonated polymer" includes both the phosphonated polymers produced by copolymerization with a phosphonated monomer and polymers and copolymers phosphonated by using a phosphonation agent in a post-polymerization reaction. The term "sulfonated and/or phosphonated polymer" includes the polymers and copolymers produced by: copolymerization with a sulfonated monomer, copolymerization with a phosphonated monomer, copolymerization with a sulfonated monomer and with a phosphonated monomer, sulfonating using a sulfonation agent in a post-polymerization reaction, phosphonating using a phosphonation agent in a post-polymerization reaction, and sulfonating and phosphonating using a sulfonation agent and a phosphonation agent in a post-polymerization reaction.

The sulfonated and/or phosphonated polymer may be prepared by copolymerizing as described, for example, in U.S. Pat. Nos. 4,102,876 and 4,387,174. Alternatively, the sulfonated and/or phosphonated polymer may be prepared by sulfonating and/or phosphonating a substrate comprising a polymer, copolymer, and the like with a sulfonation and/or a phosphonation agent. Typically, a group comprising a sulfate and/or phosphonate or derivative thereof is reacted with the substrate or grafted onto the substrate. Preferably, the substrate has an aromatic group, vinyl unsaturation or both of these characteristics. More preferably, the substrate comprises an aromatic group. The aromatic group can be present in the main polymer chain of a polymeric substrate, in a side-group attached to the main polymer chain of a polymeric substrate, or both.

Suitable sulfonation agents include $SO_3$, $SO_3$ complexes of Lewis bases, sulfonic acid, sulfuric acid, $SO_2$ with oxygen and a free radical initiator, and acyl sulfate. General techniques for sulfonation are described in U.S. Pat. Nos. 2,832,696, 2,937,066, 3,592,724, 3,613,957, 3,625,751, 3,642,728, 3,629,025, 3,770,706, 3,847,854, 31655,511, 31870,841, 3,877,530, 3,959,561, 4,102,876, 4,220,739, 4,615,914, and 4,915,912.

Suitable phosphonation agents include $PCl_3$ and an $AlCl_3$ catalyst, $PCl_3$/oxygen mixtures, dimethyl phosphite and phosphoric acid. General techniques for phosphonation are described in U.S. Pat. Nos. 3,097,194, 3,290,276 and 4,255, 540 and in British Patent Nos. 849,058 and 907,765.

It is also possible to prepare a sulfonated and/or phosphonated polymer by a process which is a hybrid of the copolymerization process and the process for sulfonating and/or phosphonating a substrate as described above. In the hybrid process, polymerization and sulfonation and/or phosphonation occur simultaneously as described in U.S. Pat. Nos. 3,097,194 and 3,397,219.

Suitable ionomers have at least about 1, preferably at least about 25, most preferably at least about 50 mol % of the sulfonate and/or phosphonate moieties of the ionomer present in an ionic form. Also at most about 99, preferably at most about 75, most preferably at most about 60 mol % of the sulfonate and/or phosphonate moieties of the ionomer are present In an ionic form.

The ionomers may be a sulfonated and/or phosphonated polymer including a sulfonated and/or phosphonated elastomeric polymer, thermoplastic polymer, thermoset polymer, or a mixture comprising at least one of the foregoing.

Suitable ionomeric elastomeric polymers include a sulfonated and/or phosphonated block copoly(ester-ester), block copoly(ester-ether), block copoly(amide-ester), block copoly(amide-ether), block copoly(urethane-ester), block copoly(urethane-ether), block polystyrene thermoplastic elastomer comprising an unsaturated rubber, block polystyrene thermoplastic elastomer comprising a functionalized substantially saturated rubber, unvulcanized thermoplastic and elastomer blend comprising polypropylene and ethylene-propylene-diene terpolymer or ethylene-propylene copolymer rubber, thermoplastic and elastomer blend comprising polypropylene and ethylene-propylene-diene terpolymer or ethylene-propylene copolymer rubber wherein the rubber is dynamically vulcanized, melt-bondable thermoplastic and elastomer blend wherein the rubber is dynamically vulcanized, or mixtures comprising at least one of the foregoing.

Suitable ionomeric thermoplastic polymers include a sulfonated and/or phosphonated olefinic polymer, polyamide, polyester, polymer comprising styrene, poly(alkyl) alkylacrylate, polycarbonate, polyphenylene oxide, polyether ketone, polysulfone, poly(phenylene sulfide), poly(etherimide), and mixtures comprising at least one of the foregoing.

Suitable ionomeric thermoset polymers include a sulfonated and/or phosphonated poly(isoprene), poly(butadiene), poly(octenemer), styrene-butadiene rubber, ethylene-propylene-diene terpolymer rubber, ethylene-propylene copolymer rubber, nitrile rubber, butyl rubber, poly(chloroprene), poly(urethane), poly(urea), poly(siloxane), chlorotrifluoroethylene copolymer rubber, vinylidene fluoride-hexafluoropropylene copolymer rubber, polysulfide rubber, epichlorohydrin rubber, unsaturated poly(ester), phenolic resin, epoxy resin, alkyd resin, allyl resin, furane resin, and mixtures comprising at least one of the foregoing.

Preferred ionomers include polyester ionomers and polyester ionomer copolymers. As used herein, the term polyester ionomer copolymers, also described in the literature as a sulfonated polyester or a metal sulfonate polyester, refers to polymers derived from the reaction of an aryl carboxylic sulfonate salt, an aliphatic or aromatic dicarboxylic acid or corresponding esters forming derivatives, and an aliphatic diol. The polyester ionomer copolymers comprise some monovalent and/or divalent sulfonate salt units represented by the formula 12 or 13:

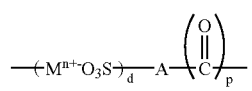

(12)

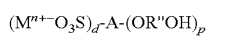

(13)

wherein d=1–3, p=1–3, p+d=2–6, M is a metal with n=1–5, R" is an alkyl group having from 2 to about 10 carbon atoms, for example, —CH$_2$CH$_2$—, —CH$_2$CH$_2$OCH$_2$CH$_2$—, —CH(CH$_3$)CH$_2$—, —CH$_2$CH$_2$CH$_2$—, —CH$_2$CH$_2$CH$_2$CH$_2$—, and A is an aryl group containing one or more aromatic rings, for example benzene, naphthalene, anthracene, biphenyl, terphenyl, oxy diphenyl, sulfonyl diphenyl or alkyl diphenyl, having a sulfonate substituent directly attached to the aryl ring. These groups are incorporated into the polyester through carboxylic ester linkages. The aryl groups may contain one or more sulfonate substituents and may have one or more carboxylic acid linkages. Groups with one sulfonate substituent (d=1) and two carboxylic linkages (p=2) such as that represented by the formula below are preferred:

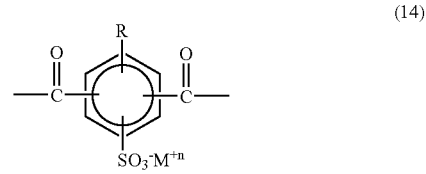

(14)

Typical sulfonate substituents that can be incorporated into the polyester ionomer copolymer may be derived from carboxylic acids or their ester forming derivatives including sodium sulfo isophthalic acid, sodium sulfo terephthalic acid, potassium sulfo terephthalic acid, sodium sulfo naphthalene dicarboxylic acid, calcium sulfo isophthalate, potassium 4,4'-di(carbomethoxy) biphenyl sulfonate, lithium 3,5-di(carbomethoxy)benzene sulfonate, sodium p-carbomethoxy benzene sulfonate, dipotassium 5-carbomethoxy-1,3-disulfonate, sodio 4-sulfo naphthalene-2,7-dicarboxylic acid, 4-lithio sulfophenyl-3,5-dicarboxy benzene sulfonate, 6-sodiosulfo-2-naphthyl-3,5-dicarbomethoxy benzene sulfonate and dimethyl 5-[4-(sodiosulfo)phenoxy]isophthalate. Other suitable sulfonate carboxylic acids and their ester forming derivatives are described in U.S. Pat. Nos. 3,018,272 and 3,546,008, which are included herein by reference. In one embodiment, the sulfonate polyesters are derived from dimethyl-5-sodiosulfo-1,3-phenylenedicarboxylate.

Polyester ionomer copolymers have the general formula 15 shown below:

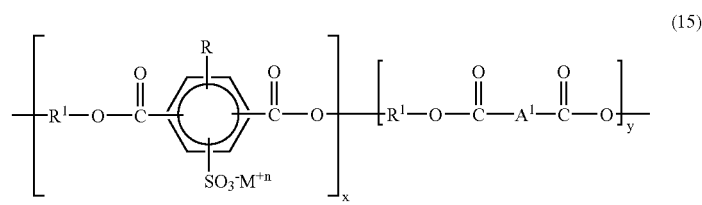

(15)

wherein the ionomer units, x, are from 0.1–50 mole percent of the copolymer, with 1.0 to 20 mole percent being preferred. The total number of units x+y equals 100 mole percent. Most preferably R is hydrogen, A$^1$ is phenylene, and R$^1$ is an alkylene radical of from C$_1$–C$_{12}$, preferably from C$_2$ or C$_4$. The x and y units are expected to be randomly distributed along the polymer backbone.

Examples of aromatic dicarboxylic alkyl ester reactants which produce the dicarboxylated residue A$^1$ in formula 14 are esters of isophthalic or terephthalic acid, 1,2-di(p-carboxyphenyl)ethane, 4,4'-dicarboxydiphenyl ether, 4,4'bisbenzoic acid and mixtures thereof. All of these esters contain at least one aromatic nucleus. Esters of acids containing fused rings can also be present, such as in 1,4-, 1,5-, or 2,6-naphthalene dicarboxylic acid esters. The preferred ester reactants are the esters of isophthalic acid or terephthalic acid or mixtures thereof. The most preferred ester reactant is dimethyl terephthalate, which is the ester of terephthalic acid.

Typical aliphatic diol reactants that produce the residue $R^1$ in formula 14 include straight chain, branched, or cycloaliphatic diols and may contain from 2 to 12 carbon atoms. Examples of such diols include but are not limited to ethylene glycol; propylene glycol, i.e., 1,2- and 1,3-propylene glycol; butane diol, i.e., 1,3- and 1,4-butane diol; diethylene glycol; 2,2-dimethyl-1,3-propane diol; 2-ethyl-2-methyl-1,3-propane diol; 1,3- and 1,5-pentane diol; dipropylene glycol; 2-methyl-1,5-pentane diol; 1,6-hexane diol; dimethanol decaline, dimethanol bicyclo octane; 1,4-cyclohexane dimethanol and particularly its cis- and trans-isomers; triethylene glycol; 1,10-decane diol; and mixtures of any of the foregoing. When cycloaliphatic diols having a mixture of cis- to trans-isomers are used, it is preferred to have a trans isomer content of about 70% or more. The most preferred aliphatic diol is 1,4-butanediol.

In one embodiment, the polyesters ionomer copolymers are those derived from poly(ethylene terephthalate) (PET), and poly(1,4-butylene terephthalate) (PBT), and poly(1,3-propylene terephthalate), (PPT).

In one embodiment, the polyester ionomer copolymer has the structure depicted in formula 16 below:

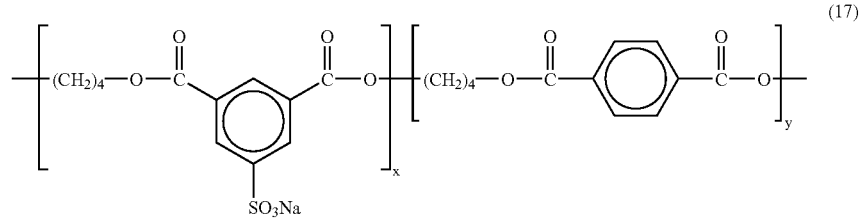

(17)

where the ionomer units, x, are from 0.1–20 mole % and the end-groups consist essentially of carboxylic acid (—COOH) end-groups and hydroxyl (—OH) end-groups.

The composition may also comprise a blend of at least about 1, preferably at least about 2, most preferably at least about 3 wt % of at least one ionomer formed from a sulfonated and/or phosphonated polymer, and at least about 1, preferably at least about 2, most preferably at least about 3 wt % of a non-sulfonated and/or phosphonated co-component polymer. Suitable co-component polymers include the non-sulfonated and/or non-phosphonated forms of the thermoplastic elastomers, thermoplastic polymers, and thermoset polymers described above, and mixtures comprising at least one of the foregoing.

Intermediate Layer—Optional Components. $TiO_2$ suitable for use herein has an average particle size greater than about 0.01 microns, preferably greater than about 0.2 microns. Also, suitable $TiO_2$, has an average particle size less than about 1 micron, preferably less than about 0.4 microns. The $TiO_2$ when used, is present in the intermediate layer in an amount greater than about 1%, preferably greater than about 3% by weight of the total layer on average. When used, the $TiO_2$ is present in the intermediate layer in an amount less than about 12%, preferably less than about 10% by weight of the total layer on average.

The thickness of the intermediate layer is also dependent on a number of factors as described above, but is generally greater than about 2 mils, preferably greater than about 3 mils, most preferably greater than about 5 mils on average. The intermediate layer also has a thickness less than about 30 mils, preferably less than about 20 mils, most preferably less than about 15 mils on average.

The intermediate layer may further comprise additional additives such suitable dyes, pigments, and special effects additives as is known in the art, as well as mold release agents, antioxidants, lubricants, nucleating agents such as talc and the like, other stabilizers including but not limited to UV stabilizers, such as benzotriazole, supplemental reinforcing fillers, and the like, flame retardants, pigments or combinations thereof.

Substrate Layer. The substrate layer is disposed in contact with the intermediate layer on a surface opposite the first layer, may be in the form of a film (for example, a layer about 1 to about 50 mils thick) or an article. The substrate comprises a polymeric material (plastic) known in the art.

Suitable substrate materials include thermoplastic resins, preferably selected from cellulosics, polyamides, polystyrenes, polyimides, polyphenylene oxides, polysulfones, vinyls, polycarbonates, polyacetal resins, polyacrylic ester resins, polyester resins, alkyds, diallyl phthalates, epoxies, melamines, phenolics, urethanes, silicones, acrylates, butyls, polysulfides, polyurethanes, neoprenes, nitrites, styrene-butadienes, and the like.

In one embodiment of the substrate layer, the plastic comprises titanium dioxide as described above and polycarbonate. The term "polycarbonate" and/or "polycarbonate composition" includes compositions having structural units of formula 18:

(18)

wherein $R^{25}$ is aromatic organic radicals and/or aliphatic, alicyclic, or heteroaromatic radicals. Preferably, $R^{25}$ is an aromatic organic radical and, more preferably, a radical having the formula -$A^1$-$Y^1$-$A^2$- wherein each of $A^1$ and $A^2$ is a monocyclic divalent aryl radical and $Y^1$ is a bridging radical having one or more atoms which separate $A^1$ from $A^2$. In an exemplary embodiment, one atom separates $A^1$ from $A^2$. Illustrative non-limiting examples of radicals of this type include: —O—, —S—, —S(O)—, —S($O_2$)—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, adamantylidene, and the like. The bridging radical $Y^1$ can be a hydrocarbon group or a saturated hydrocarbon group such as methylene, cyclohexylidene, or isopropylidene.

Suitable polycarbonates can be produced by the interfacial reaction of dihydroxy compounds in which only one atom separates $A^1$ and $A^2$. As used herein, the term "dihy droxy compound" includes, for example, bisphenol compounds having generally formula 19:

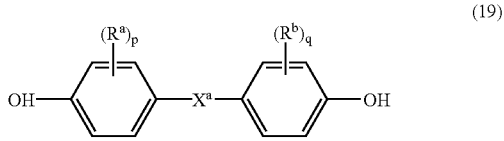
(19)

wherein $R^a$ and $R^b$ each represent a halogen atom or a monovalent hydrocarbon group and may be the same or different; p and q are each independently integers from 0 to 4; and $X^a$ is one of the groups of formula 20:

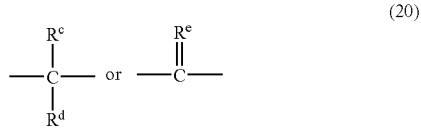
(20)

wherein $R^c$ and $R^d$ each independently represent a hydrogen atom or a monovalent linear or cyclic hydrocarbon group and $R^e$ is a divalent hydrocarbon group.

Some illustrative, non-limiting examples of suitable dihydroxy compounds include the dihydroxy-substituted aromatic hydrocarbons disclosed by name or formula (generic or specific) in U.S. Pat. No. 4,217,438. A nonexclusive list of specific examples of the types of bisphenol compounds represented by formula 11 includes: 1,1-bis(4-hydroxyphenyl)methane; 1,1-bis(4-hydroxyphenyl)ethane; 2,2-bis(4-hydroxyphenyl)propane (hereinafter "bisphenol A" or "BPA"); 2,2-bis(4-hydroxyphenyl)butane; 2,2-bis(4-hydroxyphenyl)octane; 1,1-bis(4-hydroxyphenyl)propane; 1,1-bis(4-hydroxyphenyl) n-butane; bis(4-hydroxyphenyl) phenylmethane; 2,2-bis(4-hydroxy-1-methylphenyl) propane; 1,1-bis(4-hydroxy-t-butylphenyl)propane; bis(hydroxyaryl)alkanes such as 2,2-bis(4-hydroxy-3-bromophenyl)propane; 1,1-bis(4-hydroxyphenyl) cyclopentane; and bis(hydroxyaryl)cycloalkanes such as 1,1-bis(4-hydroxyphenyl)cyclohexane.

Two or more different dihydric phenols or a copolymer of a dihydric phenol with a glycol or with a hydroxy (—OH) or acid-terminated polyester may be employed, or with a dibasic acid or hydroxy acid, in the event a carbonate copolymer rather than a homopolymer may be desired for use. Polyarylates and polyester-carbonate resins or their blends can also be employed. Branched polycarbonates are also useful, as well as blends of linear polycarbonate and a branched polycarbonate. The branched polycarbonates may be prepared by adding a branching agent during polymerization.

Suitable branching agents include polyfunctional organic compounds containing at least three functional groups, which may be hydroxyl, carboxyl, carboxylic anhydride, haloformyl, and mixtures thereof. Examples include, but are not limited to trimellitic acid, trimellitic anhydride, trimellitic trichloride, tris-p-hydroxy phenyl ethane, isatin-bisphenol, 1,3,5-tris((p-hydroxyphenyl)isopropyl)benzene, 4(4 (1,1-bis(p-hydroxyphenyl)-ethyl, alpha,alpha-dimethyl benzyl)phenol, 4-chloroformyl phthalic anhydride, trimesic acid and benzophenone tetracarboxylic acid. Branching agents may be added at a level greater than about 0.05%. The branching agents may also be added at a level less than about 2.0% by weight of the total. Branching agents and procedures for making branched polycarbonates are described in U.S. Pat. No. 3,635,895 to Kramer, and U.S. Pat. No. 4,001,184 to Scott.

Preferred polycarbonates are based on bisphenol A, in which each of $A^1$ and $A^2$ of Formula 9 is p-phenylene and $Y^1$ is isopropylidene. The average molecular weight of the polycarbonate is greater than about 5,000, preferably greater than about 10,000, most preferably greater than about 15,000. In addition, the average molecular weight is less than about 100,000, preferably less than about 65,000, most preferably less than about 45,000 g/mol.

Suitable polyesters include those derived from an aliphatic, cycloaliphatic, or aromatic diol, or mixtures thereof, containing from 2 to about 10 carbon atoms and at least one aromatic dicarboxylic acid. Preferred polyesters are derived from an aliphatic diol and an aromatic dicarboxylic acid having repeating units of the following general formula 19:

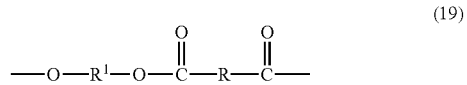
(19)

wherein $R^1$ is an $C_6$–$C_{20}$ alkyl, or aryl radical, and R is a $C_6$–$C_{20}$ alkyl or aryl radical comprising a decarboxylated residue derived from an alkyl or aromatic dicarboxylic acid.

Examples of aromatic dicarboxylic acids represented by the decarboxylated residue R are isophthalic or terephthalic acid, 1,2-di(p-carboxyphenyl)ethane, 4,4'-dicarboxydiphenyl ether, 4,4'bisbenzoic acid, and mixtures thereof. These acids contain at least one aromatic nucleus. Acids containing fused rings can also be present, such as in 1,4- 1,5- or 2,6-naphthalene dicarboxylic acids. The preferred dicarboxylic acids are terephthalic acid, isophthalic acid, naphthalene dicarboxylic acid or a mixture thereof.

The diol may be a glycol, such as ethylene glycol, propylene glycol, trimethylene glycol, 2-methyl-1,3-propane glycol, hexamethylene glycol, decamethylene glycol, cyclohexane dimethanol, or neopentylene glycol; or a diol such as 1,4-butanediol, hydroquinone, or resorcinol.

Also contemplated herein are the above polyesters with minor amounts, e.g., from about 0.5 to about 30 percent by weight, of units derived from aliphatic acids and/or aliphatic polyols to form copolyesters. The aliphatic polyols include glycols, such as poly(ethylene glycol). Such polyesters can be made following the teachings of, for example, U.S. Pat. Nos. 2,465,319 and 3,047,539.

The most preferred polyesters are poly(ethylene terephthalate) ("PET"), poly(1,4-butylene terephthalate), ("PBT"), and poly(propylene terephthalate) ("PPT"). One preferred a preferred PBT resin is one obtained by polymerizing a glycol component at least 70 mole %, preferably at least 80 mole %, of which consists of tetramethylene glycol and an acid component at least 70 mole %, preferably at least 80 mole %, of which consists of terephthalic acid, and polyester-forming derivatives therefore. The preferred glycol component can contain not more than 30 mole %, preferably not more than 20 mole %, of another glycol, such as ethylene glycol, trimethylene glycol, 2-methyl-1,3-propane glycol, hexamethylene glycol, decamethylene glycol, cyclohexane dimethanol, or neopentylene glycol. The preferred acid component can contain not more than 30 mole %, preferably not more than 20 mole %, of another acid such as isophthalic acid, 2,6-naphthalene dicarboxylic acid, 2,7-naphthalene dicarboxylic acid, 1,5-naphthalene dicarboxylic acid, 4,4'-diphenyl dicarboxylic acid, 4,4'-diphenoxyethane dicarboxylic acid, p-hydroxy benzoic acid, sebacic acid, adipic acid and polyester-forming derivatives thereof.

Block copolyester resin components are also useful, and can be prepared by the transesterification of (a) straight or branched chain poly(1,4-butylene terephthalate) and (b) a copolyester of a linear aliphatic dicarboxylic acid and, optionally, an aromatic dibasic acid such as terephthalic or isophthalic acid with one or more straight or branched chain dihydric aliphatic glycols. For example a poly(1,4-butylene terephthalate) can be mixed with a polyester of adipic acid with ethylene glycol, and the mixture heated at 235° C. to melt the ingredients, then heated further under a vacuum until the formation of the block copolyester is complete. As the second component, there can be substituted poly (neopentyl adipate), poly(1,6-hexylene azelate-coisophthalate), poly(1,6-hexylene adipate-co-isophthalate) and the like. An exemplary block copolyester of this type is available commercially from General Electric Company, Pittsfield, Mass., under the trade designation VALOX 330.

Especially useful when high melt strength is important are branched high melt viscosity poly(1,4-butylene terephthalate) resins, which include a small amount of e.g., up to 5 mole percent based on the terephthalate units, of a branching component containing at least three ester forming groups. The branching component can be one which provides branching in the acid unit portion of the polyester, or in the glycol unit portion, or it can be hybrid. Illustrative of such branching components are tri- or tetracarboxylic acids, such as trimesic acid, pyromellitic acid, and lower alkyl esters thereof, and the like, or preferably, polyols, and especially preferably, tetrols, such as pentaerythritol, triols, such as trimethylolpropane; or dihydroxy carboxylic acids and hydroxydicarboxylic acids and derivatives, such as dimethyl hydroxyterephthalate, and the like. The branched poly(1,4-butylene terephthalate) resins and their preparation are described in Borman, U.S. Pat. No. 3,953,404, incorporated herein by reference.

In addition to terephthalic acid units, small amounts, e.g., from 0.5 to 15 percent by weight of other aromatic dicarboxylic acids, such as isophthalic acid or naphthalene dicarboxylic acid, or aliphatic dicarboxylic acids, such as adipic acid, can also be present, as well as a minor amount of diol component other than that derived from 1,4-butanediol, such as ethylene glycol or cyclohexylenedimethanol, etc., as well as minor amounts of trifunctional, or higher, branching components, e.g., pentaerythritol, trimethyl trimesate, and the like. In addition, the poly(1,4-butylene terephthalate) resin component can also include other high molecular weight resins, in minor amount, such as poly(ethylene terephthalate), block copolyesters of poly(1,4-butylene terephthalate) and aliphatic/aromatic polyesters, and the like. The molecular weight of the poly(1,4-butylene terephthalate) should be sufficiently high to provide an intrinsic viscosity of about 0.6 to 2.0 deciliters per gram(dl/g), preferably 0.8 to 1.6 dl/g, measured, for example, as a solution in a 60:40 mixture of phenol and tetrachloroethane at 30° C.

Preferred aromatic carbonates are homopolymers, for example, a homopolymer derived from 2,2-bis(4-hydroxyphenyl)propane (bisphenol-A) and phosgene, commercially available under the trade designation LEXAN™ from General Electric Company. When polycarbonate is used, the polyester resin blend component of the composition comprises about 5 to about 50 percent by weight of polycarbonate, and 95 to 50 percent by weight of polyester resin, based on the total weight of the polyester blend component.

The polyester resin blend component may further optionally comprise impact modifiers such as a rubbery impact modifier. Typical impact modifiers are derived from one or more monomers selected from the group consisting of olefins, vinyl aromatic monomers, acrylic and alkyl acrylic acids and their ester derivatives, as well as conjugated dienes. Especially preferred impact modifiers are the rubbery, high-molecular weight materials including natural and synthetic polymeric materials showing elasticity at room temperature. They include both homopolymers and copolymers, including random, block, radial block, graft and core-shell copolymers, as well as combinations thereof. Suitable modifiers include core-shell polymers built up from a rubber-like core on which one or more shells have been grafted. The core typically consists substantially of an acrylate rubber or a butadiene rubber. One or more shells typically are grafted on the core. The shell preferably comprises a vinyl aromatic compound and/or a vinyl cyanide and/or an alkyl(meth)acrylate. The core and/or the shell(s) often comprise multi-functional compounds which may act as a cross-linking agent and/or as a grafting agent. These polymers are usually prepared in several stages.

Polyolefins useful herein have the general structure: $C_nH_{2n}$ and include polyethylene, polypropylene and polyisobutylene with preferred homopolymers being polyethylene, linear low density polyethylene (LLDPE), high density polyethylene (HDPE) and medium density polyethylene (MDPE) and isotatic polypropylene. Polyolefin resins of this general structure and methods for their preparation are well known in the art and are described for example in U.S. Pat. Nos. 2,933,480, 3,093,621, 3,211,709, 3,646,168, 3,790,519, 3,884,993, 3,894,999, 4,059,654, 4,166,055 and 4,584,334.

Copolymers of polyolefins are also useful including copolymers of ethylene and alpha olefins like propylene and 4-methylpentene-1. Copolymers of ethylene and $C_3$–$C_{10}$ monoolefins and non-conjugated dienes, herein referred to as EPDM copolymers, are also suitable. Examples of suitable $C_3$–$C_{10}$ monoolefins for EPDM copolymers include propylene, 1-butene, 2-butene, 1-pentene, 2-pentene, 1-hexene, 2-hexene and 3-hexene. Suitable dienes include 1,4-hexadiene and monocylic and polycyclic dienes. Mole ratios of ethylene to other $C_3$–$C_{10}$ monoolefin monomers can range from 95:5 to 5:95 with diene units being present in the amount of from about 0.1 to about 10 mol %. EPDM copolymers can be functionalized with an acyl group or electrophilic group for grafting onto the polyphenylene ether as disclosed in U.S. Pat. No. 5,258,455.

The substrate may include various additives incorporated in the resin. Such additives include, for example, fillers, reinforcing agents, heat stabilizers, antioxidants, plasticizers, antistatic agents, mold releasing agents, additional resins, blowing agents, and the like, such additional additives being readily determined by those of skill in the art without undue experimentation. Examples of fillers or reinforcing agents include glass fibers, asbestos, carbon fibers, silica, talc, and calcium carbonate. Examples of heat stabilizers include triphenyl phosphite, tris-(2,6-dimethylphenyl) phosphite, tris-(mixed mono-and di-nonylphenyl)phosphite, and dimethylbenene phosphonate and trimethyl phosphate. Examples of antioxidants include octadecyl-3-(3,5-di-tert-butyl-4-hydroxyphenyl)propionate, and pentaerythrityl-tetrakis[3-(3,5-di-tert-butyl-4-hydroxyphenyl)propionate]. Examples of plasticizers include dioctyl-4,5-epoxy-hexahydrophthalate, tris-(octoxycarbonylethyl) isocyanurate, tristearin, and epoxidized soybean oil. Examples of antistatic agents include glycerol monostearate, sodium stearyl sulfonate, and sodium dodecylbenzenesulfonate. Examples of mold releasing agents include stearyl stearate, beeswax, montan wax, and paraffin wax. Examples of other resins include but are not limited to polypropylene, polystyrene, polymethyl methacrylate, and polyphenylene oxide. Individual, as well as combinations of the foregoing may be used. Such additives may be mixed at a suitable time during the mixing of the components for forming the composition.

The substrate may contain $TiO_2$. When used, $TiO_2$ is present in the substrate in an amount greater than about 1%, preferably greater than about 3% by weight, based on the total weight of the substrate. When used, $TiO_2$ is present in the substrate in an amount less than about 12%, preferably less than about 10% by weight of the total layer on average. In one embodiment when the substrate is used in the form of a film, the substrate has a thickness greater than about 0.5 mil and less than about 70 mils. In another embodiment, it is greater than about 2 mils and less than about 50 mils. In a third embodiment, it is about greater than about 5 mils and less than about 30 mils on average.

Optional Tie Layer. In some embodiments, if there is insufficient adhesion between the substrate and the intermediate layer, or the upper layer and the intermediate layer, a tie layer between the two layers may be used. By tie layer, it is meant a material or a combination of materials that provide suitable adhesion between the two layers and/or the intermediate layer and the substrate. The tie layers may itself contain multi-layered compositions, and comprises thermoset, elastomeric and thermoplastic resins. Examples of suitable materials for use in a tie layer include epoxies, melamines, phenolics, polyesters, urethanes, silicones and the like.

Examples of commercially available tie-layers include adhesive films sold as Xiro XAF 36.154 from Adhesive Films, Inc; polyolefin adhesive films sold as Bemis 6218, Bemis 6329, Bemis 6340 from Bemis Adhesive Films and Coatings; and two-component PU adhesives Araldite 2040, 2042, and AW8680/HW8685 from Vantico Inc.

In another embodiment of the invention, the tie-layers are polyolefins or modified polyolefins, including but not limited to polyethylene, conventional low-density polyethylene (LDPE), and linear low-density polyethylenes (LLDPE). In one example, the tie-layers are based on maleic acid modified waxy ethylene polymers as described in U.S. Pat. No. 3,892,717 with good adhesion and transparency. The term "maleic acid compound" comprises maleic acid, maleic anhydride and the $C_1$ to $C_8$ dialkyl esters of maleic acid. Examples are modified polyolefin with functional group such as ADMER® from Mitsui Chemicals. In yet another embodiment, the tie-layers are blends of a polyolefin component and high-density polyethylene (HDPE) grafted with an unsaturated fused ring carboxylic acid anhydride. Examples are anhydride-modified polyolefins tie-layer adhesives available from Equistar under the tradename Plexar®.

Processing. The compositions used to manufacture each layer (or the substrate) may be formed by techniques known in the art, for example melt blending the ingredients in powder or granular form, extruding the blend and comminuting into pellets or other suitable shapes; or dry mixing the ingredients, followed by mixing in the melted state in an extruder.

The method of processing the compositions into films can be carried out by conventional film extrusion techniques, for example, by melting the different materials of the different layers in separate extruders and conveying those materials to a die where these different materials are combined into a film with a layered structure. Also included are blow molding and injection molding of the various layers.

In one embodiment of the invention in forming the multiplayer article having a weatherable surface, the upper layer and the intermediate layer are coextruded as a composite film. The substrate layer, e.g., polycarbonate, is injected onto the intermediate layer side during a subsequent molding operation. The resulting multiplayer article comprises a substrate (PC), an intermediate film and a top layer. Any ink or decorative layer can be printed on the surface of the outer layer.

The weatherable compositions are suitable for a wide variety of uses, for example in automotive applications such as body panels, cladding, and mirror housings; in recreational vehicles including such as golf carts, boats, and jet skies; and in applications for building and construction, including, for example, outdoor signs, ornaments, and exterior siding for buildings. The final articles can be formed by compression molding, multiplayer blow molding, coextrusion of sheet or injection over molding, insertion blow molding and other methods.

In one embodiment, articles comprising the multi-layer composition of the invention are characterized as having excellent chemical resistance and scratch resistance, having maintained at least 30% gloss retention in Crock-Mar tests performed in accordance with Chrysler laboratory procedure LP-463PB-54-01, and a scratch size dept of less than 20 mm in a stylus scratch test employing 400 micron stylus, 400 g load, stylus moves at 0.1 mm/sec, over 30 mm. In yet another embodiment, the gloss retention is greater than about 40% and with a scratch size depth of less than 10 mm.

The disclosure is further illustrated by the following non-limiting examples. All patents and references cited herein are incorporated by reference in their entirety.

EXAMPLES

In the examples, multi-layer compositions were back molded using a polycarbonate substrate layer as set forth in Table 1. One example represents a non-limiting embodiment of an article comprising aliphatic polyamide in the upper top layer, and is compared to other multi-layer substrates, some of which are previously disclosed or known in the art and are also commercially available. The comparative examples are submitted for purposes of evaluation only.

In the examples, a multi-layered article having an upper layer employing aliphatic polyamide is compared with articles comprising other materials in the prior art for the upper layer. In all examples, the intermediate layer is a film comprising Xenoy, a PC/PBT blend from General Electric Company. The materials are co-extruded to produce film samples of 30 mil thick, with the upper layer of about 10 mil thick.

Evaluation of the samples is presented below. A crock mar resistance test was performed in accordance with Chrysler laboratory procedure LP-463PB-54-01. Crocking resistance is used herein to mean the ability to clean laminate surfaces with a mild abrasive without removing the surface gloss/pigmentation. In the chemical resistance test, the samples were left standing in gasoline for ½ hr, then removed and observed for changes in visual appearance. The surface roughness was measured by way of stylus profilometry (2 separate runs), employing 400 micron stylus, 400 g load, stylus moves at 0.1 mm/sec, over 30 mm.

TABLE 1

| Sample No. | Top Layer Composition | Chemical Resistance Test Effect | Crock-Mar Test % Gloss Retention | Stylus Scratch Test[1] Scratch Depth (microns) | Stylus Scratch Test Scratch Depth (microns) |
|---|---|---|---|---|---|
| 1 | Polyamide[1] | none | 47 | 18 | 9.0 |
| 2 | Korad[1] | none | 21 | 30 | 13.6 |
| 3 | Clear Coat[4] | none | — | 8 | 8.7 |
| 4 | PCCD[2] | Surface dulls | 8 | 35 | 20 |
| 5 | PC[3] | cracks | 42 | 18 | 12.3 |

[1]Trogamid - transparent polyamide from Degussa AG.
[2]Eastman PCCD product having a designation number of X2873
[3]Lexan PC105 from General Electric Company of Pittsfield, MA.
[4]Clear Coat - acrylic urethane clear coat from PPG of Pittsburg, PA.
[5]Korad - acrylic film from Polymer Extruder Products.

As shown above, the polyamide top layer in Example 10 provides for a multi-layered article having improved chemical protection and scratch resistance over the base substrate layer (i.e., polycarbonate (PC), polyester (PCCD), and Korad alone.

While the invention has been described with reference to an exemplary embodiment, it will be understood by those skilled in the art that various changes may be made and equivalents may be substituted for elements thereof without departing from the scope of the invention.

What is claimed is:

1. A multi-layer composition, comprising
   a) an upper layer comprising an aliphatic polyamide, and an additive composition comprising a hindered amine light stabilizer and a hydroxyphenyl-triazine or -pyrimidine UV absorber;
   b) an intermediate layer comprising a polymeric ionomer resin having at least some negatively charged moieties selected from the group consisting of sulfonate and phosphonate moieties; and
   c) a polymeric substrate; wherein said intermediate layer is disposed between and in intimate contact with said upper layer and said substrate.

2. The multi-layer composition of claim 1, characterized by a peel strength adhesion between the upper layer and the intermediate layer of at least about 5 pounds per inch as measured by a 180 degree peel test.

3. The multi-layer composition of claim 1, wherein the intermediate layer further comprises an additive composition comprising at least one of $TiO_2$, dyes, pigments, special effects additives, or a mixture thereof.

4. The multi-layer composition of claim 1, wherein said hindered amine light stabilizer comprises a substituted piperidine moiety or an oligomer substituted piperidine moiety.

5. The multi-layer composition of claim 4, wherein said hindered amine light stabilizer is selected from one of:
   a) a 4-piperidinol derivative having the general formula

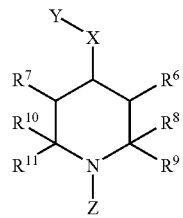

wherein X is oxygen; Y is hydrogen, hydroxyalkyl, aminoalkyl, or alkyl substituted by both hydroxyl and amino groups, where the alkyl has up to about 20 carbon atoms on average; $R^6$ and $R^7$ are each independently selected from the group consisting of hydrogen, an alkyl group, an alkenyl group, or an arylalkyl group; $R^8, R^9, R^{10,}$ and $R^{11}$ are each independently selected from the group consisting of an alkyl group having 1 to about 6 carbon atoms, phenyl, an arylalkyl group, an aromatic heterocyclic group having 5 or 6 carbon atoms, and containing an oxygen, sulphur or nitrogen atom, or $R^{8,} R^{9,} R^{10,}$ and $R^{11}$ respectively, together or with the carbon atom to which they are attached are a $C_5$ to $C_{12}$ cycloalkyl group; Z is an oxy radical, an alkyl group, an alkenyl group, an alkoxyalkyl group, an arylalkyl group that is unsubstituted or which has one or more substituents in its aryl moiety; and $R^{13}$ is hydrogen, an alkyl group, an ester, a carbonyl, an acyl group, an aliphatic acyl group, or a group represented by the formula —$COOR^{15}$, or —$OOCR^{15,}$ wherein $R^{15}$ is an alkyl group, a benzyl group, a phenyl group;
   b) a hindered amine light stabilizer of the formula:

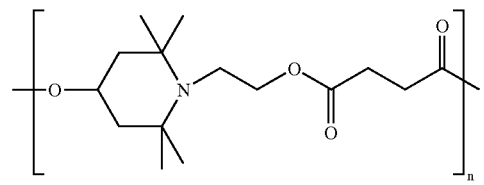

wherein n is on average greater than about 9, and less than about 12
   c) a hindered amine light stabilizer of the formula:

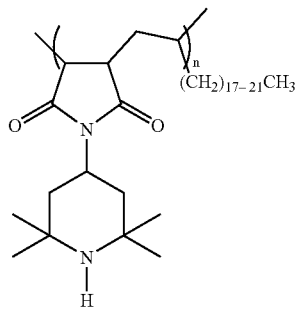

wherein n is on average greater than about 4, and less than about 7;

d) a hindered amine light stabilizer of the formula:

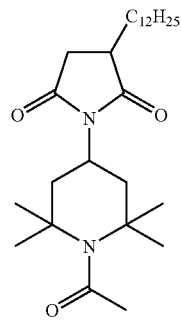

e) or a hindered amine light stabilizer of the formula:

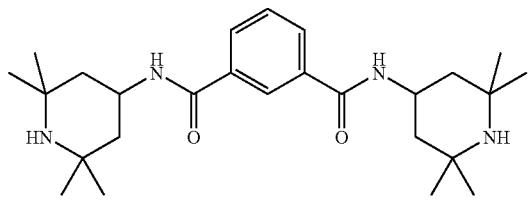

f) or a mixture comprising at least one of the foregoing hindered amine light stabilizers.

6. The composition of claim 1, wherein said hindered amine light stabilizer is present in an amount greater than about 0.1% by weight, and less than about 10% by weight of the total weight of said upper layer.

7. The composition of claim 1, wherein said hydroxyphenyl-triazine or -pyrimidine UV absorber contains a 2,4,6-trisaryl-1,3,5-triazine moiety and a free hydroxyl group, or contains a 2,4,6-trisaryl-1,3-pyrimidine moiety and a free hydroxyl group.

8. The composition of claim 1, wherein said UV absorber is selected from one of:

a) an UV absorber of the formula:

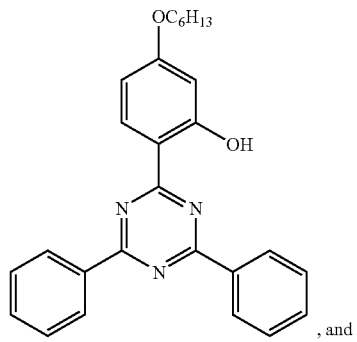
, and b) an UV absorber of the formula:

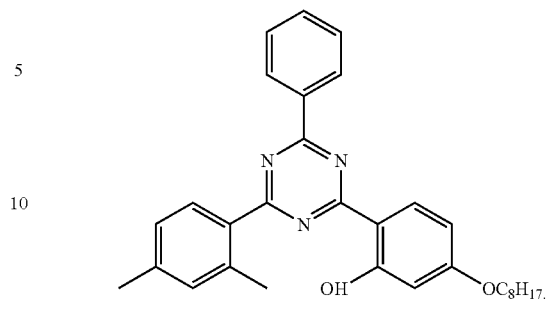

9. The composition of claim 1, wherein said hydroxyphenyl-triazine or -pyrimidine UV absorber is present at a concentration greater than or equal to about 0.01% by weight, and less than or equal to about 10% by weight of said upper layer.

10. The composition of claim 1, wherein the substrate layer comprises polycarbonate.

11. The composition of claim 1, wherein the substrate is in the form of a film.

12. An article comprising the composition of claim 1.

13. The multi-layer composition of claim 1, wherein said intermediate layer comprises a blend of a polycarbonate and a polymeric ionomer.

14. An article comprising the composition of claim 13.

15. The multi-layer composition of claim 13, wherein a peel strength adhesion between the upper layer and the intermediate layer is at least about 5 pounds per inch as measured by a 180 degree peel test.

16. A multi-layer composition, comprising a) an upper layer comprising an aliphatic polyamide, and an additive composition comprising a hindered amine light stabilizer and a hydroxyphenyl-triazine or -pyrimidine UV absorber; b) an intermediate layer comprising a polymer system compatible with the aliphatic polyamide of said upper layer, for a peel strength adhesion between the upper layer and the intermediate layer of at least about 5 pounds per inch as measured by a 180 degree peel test; c) a polymeric substrate; wherein said intermediate layer is disposed between and in intimate contact with said upper layer and said substrate, wherein said intermediate layer comprises a polymeric ionomer resin having at least some negatively charged moieties selected from the group consisting of sulfonate and phosphonate moieties, and wherein the polymeric ionomer resin is a polyester ionomer resin.

17. The composition of claim 1, wherein the polymeric ionomer resin is a polyester ionomer resin.

* * * * *